(No Model.)

W. F. MORTON.
WHEEL FELLY JOINT.

No. 529,131. Patented Nov. 13, 1894.

Witnesses
J. H. Shunway
Lillian D. Kelsey

William F. Morton.
Inventor.
By Attys
Earle Seymour

UNITED STATES PATENT OFFICE.

WILLIAM F. MORTON, OF NEW HAVEN, CONNECTICUT.

WHEEL-FELLY JOINT.

SPECIFICATION forming part of Letters Patent No. 529,131, dated November 13, 1894.

Application filed March 19, 1894. Serial No. 504,212. (No model.)

*To all whom it may concern:*

Be it known that I, WILLIAM F. MORTON, of New Haven, in the county of New Haven and State of Connecticut, have invented a new Improvement in Wheel-Felly Joints; and I do hereby declare the following, when taken in connection with the accompanying drawings and the letters of reference marked thereon, to be a full, clear, and exact description of the same, and which said drawings constitute part of this specification, and represent, in—

Figure 1:
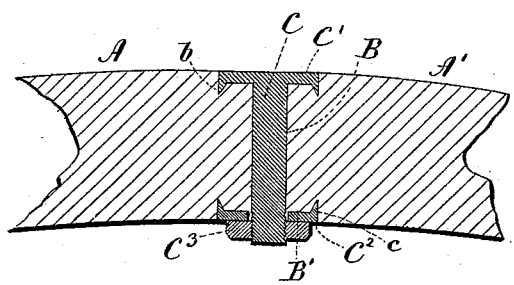
Figure 2:
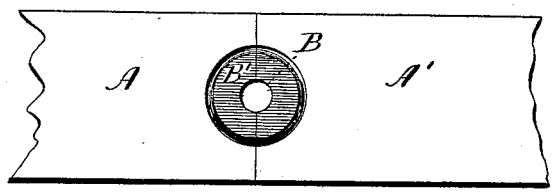
Figure 3:
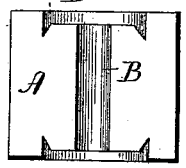

Figure 1, a broken view in vertical longitudinal section of a wheel felly joint constructed in accordance with my invention; Fig. 2, a broken plan view thereof; Fig. 3, a view in end elevation of one end of the felly with the bolt and its coupling heads and nut removed.

My invention relates to an improvement in wheel-felly joints, the object being to produce a simple, cheap and superior construction.

With these ends in view, my invention consists in a wheel felly-joint having certain details of construction and combinations of parts as will be hereinafter described and pointed out in the claims.

In carrying out my invention, the ends A and A' of the felly are cut so as to be squarely abutted together. When so abutted a radial bore B is formed, extending through them, and equally divided between them. At each end and concentric with this bore, there is formed a shallow circular recess B', cut radially inward at its outer edge, as at $b$. It will be readily understood that the concentric recesses at the ends of the bore, may be formed by the spur of a suitable bit. The abutting ends of the felly having been prepared, as described, they are coupled together by means of a coupling-bolt C, a fixed coupling-head C' located at one end thereof, a corresponding removable coupling head $C^2$, and a nut $C^3$. The bolt C is adapted in diameter to fit snugly within the bore B, while the coupling-head C', which is by preference formed integral with the bolt, conforms in depth to the depth of the outer recess B', so that when the ends of the felly are coupled together, the outer face of the head C' will be flush with the outer periphery of the felly. The inner edge of the head C' is furnished with an inwardly extending annular flange $c$, having a straight outer and a beveled inner face, and having a pointed edge. This flange takes into the cut extending inward from the edge of the said outer circular recess and its beveled inner face operates to draw the ends of the felly together. The removable coupling-head $C^2$, has an annular flange $c$, having a beveled inner, and a straight outer edge and corresponds in construction to the fixed head C', except that it has a central opening $c'$ adapting it to be passed over the externally threaded inner end of the bolt. This head conforms in thickness to the depth of the inner recess $B^2$, and its annular beveled flange $c$ takes into the inwardly extending cut around the edge of the said recess. The outer face of this head is flush with the inner periphery of the felly, and forms a bearing for the nut $C^3$, which is screwed over the projecting end of the bolt, and by means of which the bolt and its two coupling heads are drawn into place.

My improved joint is simple and cheap, and very effective on account of the secure grip that the coupling heads have upon the abutting ends of the felly, which it prevents not only from separating but also from splitting either longitudinally or laterally.

If desired the nut may be dispensed with, and the threads upon the bolt omitted, and the end of the bolt headed down upon the outer face of the removable coupling-head, or, both coupling heads may be made independent of the bolt and with circular openings for the same to pass through so as to be headed down at both ends upon their outer faces. I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. A felly joint having the felly ends abutted squarely together, and constructed with a radial bore, and two shallow circular recesses, respectively concentric with the ends of the said bore, and each having an inwardly extending cut formed at their outer edges, the said bore and recesses being divided equally in the respective abutting ends of the felly, a bolt extending through the said bore, and provided at one end with a fixed circular coupling head corresponding in depth to the depth of the recess which receives it, and having an inwardly extending flange having a straight outer and a beveled inner face; a removable coupling head having a central opening adapted to be passed over the opposite end of the bolt, and corresponding in thickness to the depth of its recess, and having an inwardly extending flange, the outer face of which is straight and the inner face beveled; and a nut applied to the threaded end of the bolt and bearing upon the removable coupling head, substantially as set forth.

2. A felly-joint having the felly ends abutted squarely together, and constructed with a radial bore, and two shallow circular recesses respectively concentric with the ends of the said bore, and each having an inwardly extending cut formed at their outer edges, the said bore and recesses being divided equally in the respective abutting ends of the felly, a bolt extending through the said bore, and two coupling heads located at the opposite ends of the bolt, corresponding in thickness to the depth of the said recesses, and each having an inwardly extending flange the outer face of which is straight and the inner face beveled for taking into the cuts formed at the edges of the recesses, substantially as set forth.

In testimony whereof I have signed this specification in the presence of two subscribing witnesses.

WILLIAM F. MORTON.

Witnesses:
GEO. D. SEYMOUR,
FRED. C. EARLE.